United States Patent [19]

Hirzel et al.

[11] 3,920,278

[45] Nov. 18, 1975

[54] SELECTIVE DECELERATION BRAKE CONTROL SYSTEM

[75] Inventors: Edgar A. Hirzel, Granada Hills; Robert Dale Cook, Newhall, both of Calif.

[73] Assignee: Crane Co., Chicago, Ill.

[22] Filed: Aug. 30, 1973

[21] Appl. No.: 393,069

[52] U.S. Cl. ......... 303/21 BE; 188/181 A; 244/111
[51] Int. Cl.² ......................................... B60T 8/08
[58] Field of Search ................ 188/181 A; 244/111; 303/20, 21, 24; 317/5; 324/162; 340/53, 262

[56] References Cited
UNITED STATES PATENTS

| | | | |
|---|---|---|---|
| 3,545,817 | 12/1970 | Yarber | 303/21 P |
| 3,554,612 | 1/1971 | Harned | 303/21 BE |
| 3,578,819 | 5/1971 | Atkins | 303/21 P |
| 3,614,174 | 10/1971 | Romero | 303/21 CG |
| 3,711,163 | 1/1973 | Booher | 244/111 X |

Primary Examiner—Trygve M. Blix
Assistant Examiner—Stephen G. Kunin
Attorney, Agent, or Firm—Henry L. Brinks; Jack C. Berenzweig

[57] ABSTRACT

A selective deceleration brake control system which enables the operator of an aircraft or other vehicle to preselect the rate of deceleration for the vehicle. The system produces a deceleration reference signal of constant magnitude which is preselectable by the operator to be indicative of the desired rate of the vehicle deceleration. A signal indicative of the actual wheel velocity is differentiated by a compelled agreement circuit and compared with the deceleration reference signal to generate a deceleration error signal. The deceleration error signal is processed and used to produce a brake control signal thereby causing the vehicle to decelerate at the desired rate of deceleration.

12 Claims, 3 Drawing Figures

SELECTIVE DECELERATION BRAKE CONTROL SYSTEM

BACKGROUND OF THE INVENTION

The present invention relates to a deceleration control system for a vehicle, and more particularly, to a selective deceleration brake control system which is effective to control braking effort to cause the vehicle to decelerate at a rate selected and set by the operator.

It has been the general practice to provide anti-skid brake control systems on commercial aircraft to aid the aircraft in its deceleration after landing. Anti-skid systems have reached a point of development beyond merely detecting and terminating wheel skids. A modern anti-skid system functions to optimize braking efficiency by continuously adapting to changing runway conditions and other factors affecting braking to provide maximum braking effort consistent with the level of brake pressure selected by the pilot brake pedal control. One such anti-skid system is disclosed in U.S. Pat. No. 3,768,873 issued Oct. 30, 1973 entitled BRAKE CONTROL SYSTEM.

Despite the development of superior anti-skid brake control systems, however, it remained necessary for the pilot to continuously adjust the level of brake pressure by manual brake pedal adjustment or manipulation in order to accomplish smooth and comfortable deceleration of the aircraft. To overcome this, automatic deceleration control systems were developed. One such deceleration control system is disclosed in U.S. Pat. No. 3,520,575, issued to J. R. Steigerwald on July 14, 1970. In this deceleration control system, the pilot would place the brake pedal in a preselected position. The maximum rate of deceleration, not controllable by the pilot, was programed into the system such that the aircraft would decelerate in accordance with the position of the pilot's brake pedal insolong as the position of the pedal would not exceed the maximum rate of deceleration. In this system, the speed of the aircraft is used only to regulate the maximum rate of deceleration and is not used to continuously control the deceleration rate of the aircraft.

Another more sophisticated deceleration control system is disclosed in United States patent application Ser. No. 243,251, filed by Edgar A. Hirzel et al. on Apr. 12, 1972. In this system, the wheel speed of the aircraft is converted into an electrical signal indicative of the velociity of the wheel or wheels being controlled by the system. A reference generating means is provided for generating a reference velocity signal having a preselectable rate of decrease. A comparator means continuously compares the wheel velocity signal with the reference velocity signal to provide a velocity error signal indicative of the difference between the wheel velocity signal and the reference velocity signal. This velocity error signal is submitted to a modulation circuit which generates a modulation signal which is a time integral function of the velocity error signal. The modulation signal and the error signal itself are continuously summed in an OR amplifier to form a composite deceleration brake control signal for transmission to the valve drive associated with the wheel or wheels which are being controlled. The brake pressure level applied is a proportional function of the deceleration control signal, and in this way, the braking is controlled to cause the vehicle to decelerate in accordance with the preselected rate of deceleration chosen by the operator of the vehicle. In this system, the deceleration of the aircraft is related to the velocity of the aircraft and differs from the first system disclosed in the aforementioned Steigerwald patent in that the first system only sets a limit or maximum rate of deceleration. In addition, in this latter system, the pilot need not operate the brake pedal to decelerate the aircraft.

The present invention is an improved deceleration control system which also relieves the pilot of the burden of constant attention to brake pedal adjustment and which provides a smooth, comfortable deceleration of the aircraft by automatically controlling brake pressure thereby causing the aircraft to decelerate at a rate preselected by the pilot. The present invention differs from that disclosed in application Ser. No. 243,251 in that in the present invention, the deceleration of the wheels of the aircraft are compared to a reference deceleration signal while in the former system, the velocity of the wheels is compared to a velocity reference signal. By monitoring the deceleration of the aircraft, rather than the velocity of the aircraft, a simplified system may be obtained.

SUMMARY OF THE INVENTION

As indicated, the general purpose of this invention is to provide a selective deceleration system for decelerating a vehicle at a preselected rate of deceleration. Briefly, the selected deceleration system comprises analog means, including a transducer, for generating an electric analog signal indicative of the velocity of the wheel or wheels being controlled by the system. This analog signal is then converted by a compelled agreement circuit into a deceleration signal which is a function of the rate of deceleration of the wheel or wheels being controlled. A reference generating means is provided for generating a reference deceleration signal of preselected constant magnitude. A rate selector means is provided for manually selecting a preselected reference deceleration signal which is indicative of the desired rate of deceleration. A comparator means continuously compares the deceleration signal with the selected reference deceleration signal to provide a deceleration error signal which is indicative of the difference between the deceleration signal and the reference deceleration signal. The error signal is submitted to a deceleration control means which is responsive to the error signal and which provides a deceleration brake control signal for controlling the application of the brake means thereby causing the wheel or wheels to decelerate at the desired rate of deceleration.

The selective deceleration control system of the present invention may be used in combination with a conventional anti-skid system. In this circumstance, the anti-skid system would control the brake application only when the deceleration brake control signal from the selective deceleration control system would cause the wheels to skid. As an additional safety feature, the present invention is provided with a means to allow the pilot to immediately discontinue the use of the selective deceleration control circuit by throwing a suitable switch in the cockpit or by manually applying control braking by touching the brake pedals. When this is done, only the anti-skid circuit would be effective to modify the braking of the aircraft.

The deceleration control system of the present invention may be used to control the deceleration and braking of a single wheel or a plurality of wheels.

The foregoing features and objects and many of the attendant advantages of this invention will be more readily appreciated by reference to the following detailed description when considered in connection with the accompanying drawings wherein like reference characters designate like or corresponding parts throughout the several views.

DESCRIPTION OF THE PREFERRED EMBODIMENT

Figure 1:
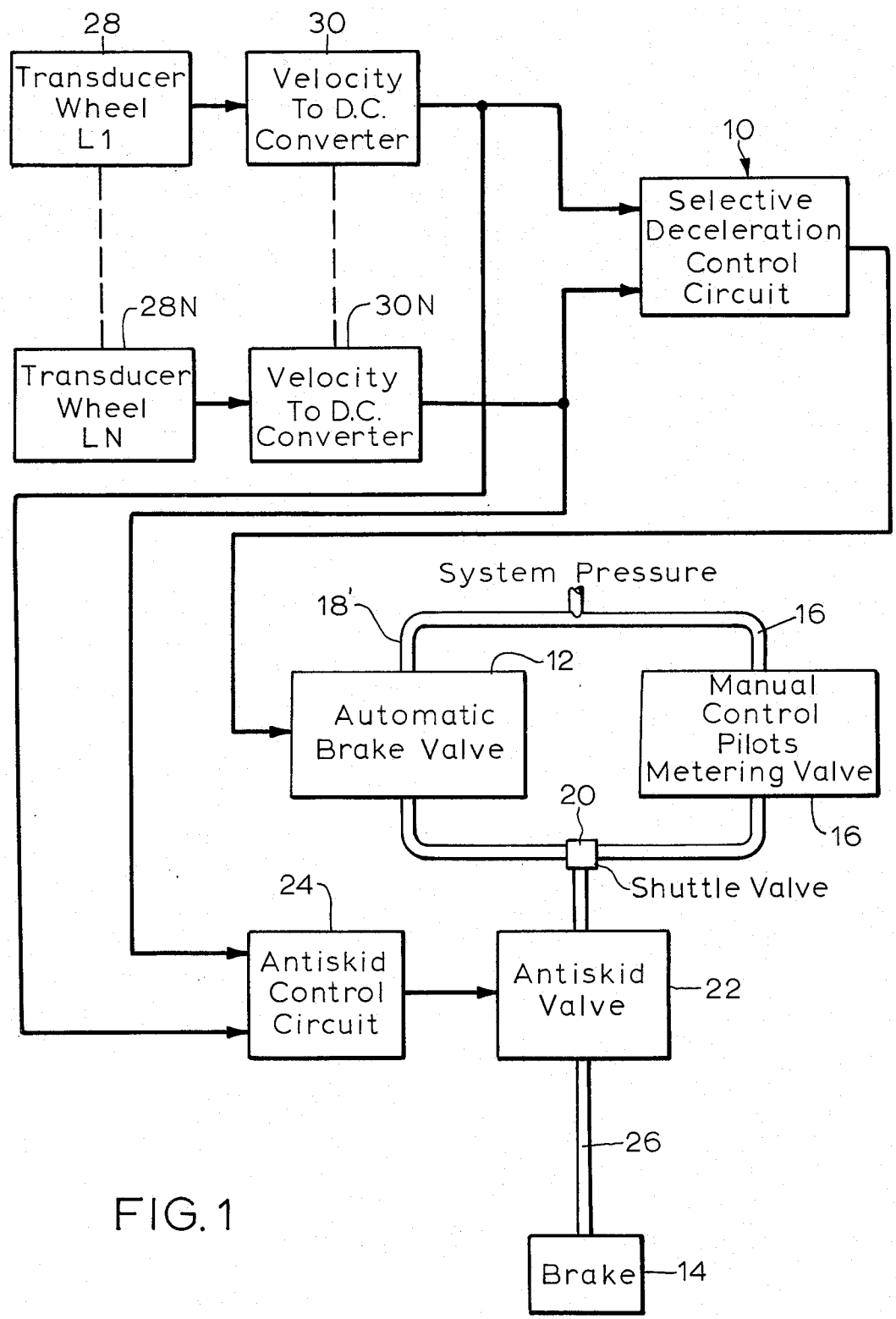
FIG. 1 is a functional block diagram of an exemplary aircraft brake control system embodying a preferred form of the invention.

Referring now to the drawings wherein like reference characters designate like or corresponding parts throughout the several views, a preferred embodiment of the invention is illustrated as used in an exemplary brake control system for an aircraft having a plurality of braked wheels. It will be understood, however, that one selective deceleration control circuit may be utilized to control the braking of all the wheels or a plurality of selective deceleration control circuits may similarly be used to control a fewer number of wheels. In some applications, it may be found desirable to provide a selective deceleration control circuit for each wheel.

Although the selective deceleration control system can be utilized without associated anti-skid circuitry, a more effective and safer braking system is provided by using the selective deceleration control circuit 10 in conjunction with an anti-skid system such as that described in the aforementioned Hirzel U.S. Pat. No. 3,768,873.

Figure 2:
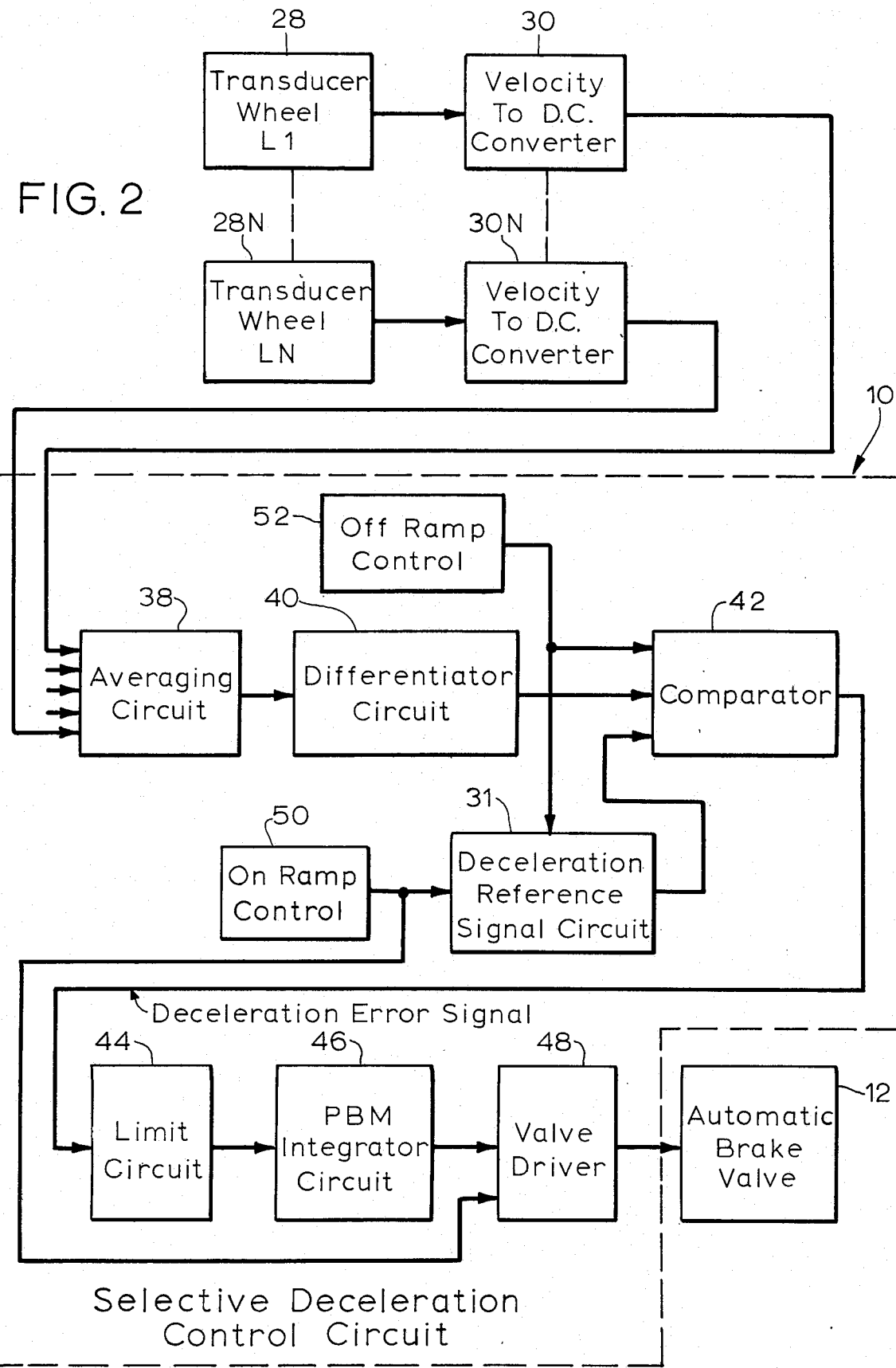
FIG. 2 is a functional block diagram of the principal units of the deceleration control circuit 10 from FIG. 1.

Referring now to FIGS. 1 and 2, the selective deceleration control circuit 10 will be described. The selective deceleration control circuit 10 is designed to control an automatic brake valve 12 which in turn is utilized to control the brakes on the wheels of the aircraft 14. The automatic brake valve is a conventional brake valve and is located in parallel with the conventional manual control pilot metering valve 16. Hydraulic fluid travels under pressure through a plurality of conduits referred to schematically by the numerals 18 and 18'. The fluid pressure is controlled by either the automatic brake valve 12 or the manual control pilot metering valve 16. When the selective deceleration control circuit 10 is not being utilized, the control of the brake pressure for the brake 14 is solely controlled by the pilot through the use of his manual control pilot metering valve 16 which may be regulated by a conventional brake pedal located in the cockpit. The hydraulic fluid then passes through a conventional shuttle valve 20 and through an anti-skid valve 22. The operation of the anti-skid valve 22 is solely controlled by an anti-skid control circuit 24. As mentioned previously, the anti-skid control circuit 24 is an optional feature and need not be utilized. However, if it is utilized, any anti-skid control circuit 24 may be employed such as that shown in the aforementioned Hirzel U.S. Pat. No. 3,768,873. The fluid pressure in a conduit 26 then controls the application of the brakes 14 to the wheels of the aircraft.

Both the selective deceleration control circuit 10 and the anti-skid control circuit 24 receive wheel speed information from a plurality of conventional velocity transducers 28 through 28n associated with each of the wheels. A full description of these transducers may be found in the aforementioned Hirzel U.S. Pat. No. 3,768,873. Briefly, a transducer 28 is associated with each wheel on the aircraft. The transducer provides a signal whose frequency is representative of the wheel speed of the wheel being controlled. This signal is then transmitted to a conventional velocity to D.C. converter 30 which is also fully described in said aforementioned Hirzel U.S. Pat. No. 3,768,873. The output from velocity to the D.C. converter 30 is an analog voltage that varies directly with the wheel speed of the wheel being controlled. As shown in FIG. 1, a plurality of transducers 28 through 28n and a plurality of velocity converters 30 through 30n are utilized. It will be recognized that any number of these elements may be utilized depending upon the number of wheels being controlled. This wheel speed information from the velocity converters 30 through 30n is then transmitted to both the selective deceleration control circuit 10 and to the anti-skid control circuit 24.

Referring now to FIG. 2, the functional description of the selective deceleration control circuit 10 will be expalined further. The selective deceleration control circuit 10 obtains wheel speed information from the transducers 28 through 28n and velocity to D.C. converters 30 through 30n associated with each wheel. The selective deceleration control circuit 10 then automatically applies and controls the brake pressure in a smooth manner to maintain a preselected deceleration level which is set by the pilot by means of a selective switch 32 (FIG. 3) located in the cockpit. In the preferred embodiment, three deceleration levels are available and are tentatively set at 10, 7 and 4 feet/second$^2$. However, it will be recognized that any number of deceleration levels may be utilized and the parameters given in the preferred embodiment are not limiting. If the braking coefficient of the runway is insufficient to allow the selected deceleration level, the anti-skid control circuit 24 (FIG. 1) will automatically take over to control the brake pressure through the use of the anti-skid valve 22 until a non-skid condition occurs and then the selective deceleration control circuit 10 will again control.

Figure 3:
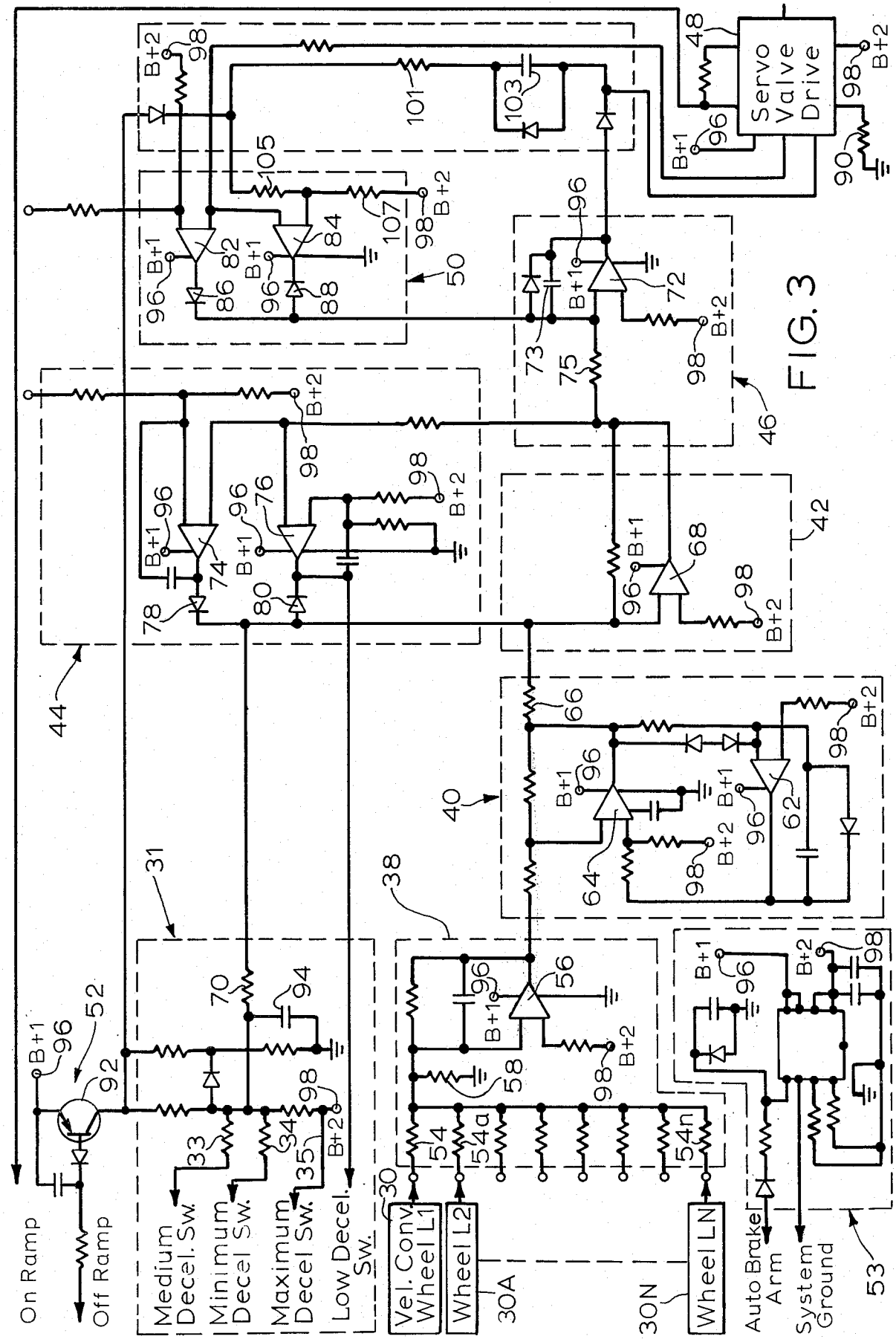
FIG. 3 depicts in block and schematic diagram form, the circuit details of the selective deceleration control circuit shown in FIG. 2.

The input to the selective deceleration control circuit 10, from the velocity converters 30 through 30n is transmitted to an averaging circuit 38. The averaging circuit 38 converts the voltages into a voltage signal which is the average of the input voltages representing the average wheel speed of the aircraft. This information is then transmitted to a differentiator circuit 40. At the output of a differentiator circuit 40 is a signal which represents the average deceleration of the wheels being controlled by the selective deceleration circuit 10. This signal representative of the average deceleration of the wheels is then transmitted to a comparator circuit 42. Also applied to the input of the comparator circuit 42 is a deceleration reference voltage signal which is a constant magnitude voltage selected by the pilot through the use of his selective deceleration switch 31 (FIG. 3). The selected reference deceleration voltage and the average deceleration voltage signal are compared by the circuit 42 and the output signal is representative of the deceleration error signal. This deceleration error signal is then transmitted through a conventional limit circuit 44 to a conventional integrator circuit 46 which functions in a manner similar to the PBM circuit described in the above mentioned Hirzel U.S. Pat. No. 3,768,873 and Hirzel et al. patent application Ser. No. 243,251. The output from the integrator 46 is then converted into a current by the valve driver circuit 48 which in turn controls the automatic brake valve 12 which in turn causes the brake 14 to apply brake pressure to each of the wheels.

As will be explained in greater detail below, the limit circuit 44 is utilized to prevent the voltage output of the comparator 42 or in other words, the deceleration error signal, from exceeding a certain limit or dropping below a certain limit. This feature is utilized as a safety feature but is not necessary for the operation of the selective deceleration control circuit 10.

The selective deceleration control circuit 10 is activated or turned on by the use of an on-ramp control 50 and may be deactivated or turned off by an off-ramp control 52. The on-ramp control 50 and the off-ramp control 52 may be actuated by a switch located in the cockpit of the aircraft. As will be explained below, the on-ramp control 50 initially provides a large valve current pulse and ramp to the automatic brake valve 12 to eliminate the initial delay normally encountered in filling the hydraulic lines in order to insure that the initial application of brake pressure will be linear.

After a few hundred milliseconds, the deceleration error signal from the output of the comparator 42 will begin to control the current to the automatic brake valve 12 to establish the selected deceleration rate. When the off-ramp signal is applied by the off-ramp control 52, the reference deceleration voltage will begin to decrease and the brake pressure will decrease in proportion to this voltage. This will automatically deactivate the selective deceleration control circuit 10 and will return the braking control of the aircraft to the pilot through the manual control pilot's metering valve 16. While the off-ramp control 52 and the on-ramp control 50 may merely be switches, it will be understood that suitable logic switching means may also be employed.

Now referring to FIG. 3, a complete schematic of the selective deceleration control circuit 10 will be described. Power is provided to the selective deceleration control circuit through a voltage regulator 53. The voltage regulator circuit 53 may comprise any suitable conventional voltage regulator. The power from the voltage regulator 53 to the selective deceleration control circuit 10 is only provided at the command of the pilot by placing the automatic brake selection switch (not shown) in the ON position and by placing the anti-skid selection switch (not shown) in the ON position.

The off-ramp control 52 may be actuated by either depressing the pilot brake pedal ten percent or automatically by three or more seconds elapsing after spin-up at touchdown.

The input to the selective deceleration control circuit 10 comes from each of the transducers 28 through 28n associated with each of the wheels which are to be controlled through the velocity converters 30 through 30n. The voltages produced by the various velocity converters 30 through 30n are applied through the resistors 54 through 54n to the inverting side of an amplifier 56. The amplifier 56 is a conventional amplifier and may be fabricated from a solid state chip. The gain from each of the inputs to the output of the amplifier 56 is one-eighth and since there are eight inputs in the preferred embodiment, the total gain of the input amplifier circuit is unity. It will be recognized that if a different number of inputs were utilized, the input gain of the amplifier would also have to be altered. At the output of the amplifier 56, the voltage is of the same magnitude as the average of the voltages at the inputs. Thus, the amplifier 56 and its associated biasing resistors from the averaging circuit 38 referred to above. In the preferred embodiment, the reference side of the amplifier 56 is set at +4 volts and if there is zero wheel speed, the voltage at the wheel speed inputs will also be approximately +4 volts. The 4 volts for the system may be obtained with suitable connection 96 to the voltage regulator 53. The quiescent output voltage of the amplifier 56 is then determined by the value of the resistors 58 and 60 or is approximately 4 volts times $$\left(\frac{R60}{R58}\right).$$

which equals plus 8 volts above the 4 volts. If there is a wheel speed input, then this voltage will go in a negative direction with respect to the 12 volts.

The differentiator circuit 40 comprises two amplifier 62 and 64. The output from the amplifier 56 which is a measure of the average wheel velocity of the wheels being controlled, is differentiated by a compelled agreement circuit comprising amplifiers 62 and 64 to obtain the average deceleration. The output from the amplifier 64 is therefore proportional to the aircraft deceleration and this output signal is then applied through the resistor 66 to the input of the comparator circuit 42.

The comparator 42 comprises a conventional inverting amplifier 68. In addition to the input from the output of the amplifier 64, a reference deceleration voltage is applied to the input of the amplifier 68 of the comparator 42 through a resistor 70. The reference deceleration voltage is selected by the deceleration switch 32 located in the cockpit of the aircraft. The deceleration switch 32 applies a voltage of fixed magnitude by connecting through either the resistor 34 or 33 to the lead 35 or by leaving the circuit open. These voltages represent either a minimum, medium or maximum deceleration of the aircraft and the preferred embodiment are 4, 7 and 10 feet/second$^2$, respectively. The reference deceleration voltage and the deceleration voltage from the differentiator 40 are of opposite polarity with respect to the +4 volts and the difference between them is proportional to the difference between the selective reference deceleration and the aircraft deceleration, or in other words, becomes a deceleration error signal.

This deceleration error signal is amplified by the amplifier 68 which in the preferred embodiment has a gain of −5 and is integrated by the integrator 46. The integrator 46 in essence comprises an amplifier 72 and capacitor 73. The integrator 46 performs a function similar to the PBM circuit described in the aforementioned Hirzel application Ser. No. 155,903 now U.S. Pat. No. 3,768,873. The output from the integrator 46 is proportional to the average of its input over a given time period. The output voltage from the integrator 46 is converted to a current by the valve driver circuit 48. The conversion gain is one volt equals 5 milliamps in the preferred embodiment. The current from the output of the valve drive 48 then controls the automatic brake valve 12, thereby controlling the available pressure to the brake 14.

The limiting circuit 44 is in essence formed from two perfect diode circuits comprising a pair of amplifiers 74 and 76. The limiting circuit 44 limits the magnitude of the deceleration error signal which is available at the output of the comparator 42 and thereby limits the maximum rate of change of the hydraulic pressure to the brakes 14. If the output of the amplifier 68 is between +3.5 volts and +4.5 volts, then the output of the amplifier 74 is low and the output of the amplifier 76 is high. In this instance, a pair of diodes 78 and 80 are then backed biased and will therefore not effect the operation of the comparator amplifier 68. If the output from the amplifier 68 however should try to exceed 4.5 volts, then the output from the amplifier 74 becomes high enough to supply sufficient current to the inverting side of the amplifier 68 thereby preventing the output from being any higher then +4.5 volts. The converse happens if the actual deceleration of the aircraft is below the selected deceleration level determined by the switch in the cockpit. In that case, the output of the amplifier 68 tends to go below 3.5 volts and the output from the amplifier 76 goes low, thereby causing the diode 80 to conduct which clamps the deceleration error signal at +3.5 volts. A similar limiting circuit is also provided for the integrator 46. This is accomplished by means of a perfect diode circuit comprising a pair of amplifiers 82 and 84 and associated diodes 86 and 88. The amplifier 82 and 84 thereby set an upper and lower limit on the valve current and thereby an upper and lower limit on the hydraulic pressure which is being transmitted to the brake 14.

The only remaining aspects of the selective deceleration control circuit 10 which have not been explained concern the on-ramp control circuit 50 in FIG. 2 and the off-ramp control circuit 52. Before wheel spin-up, the output of the amplifier 72 of the modulator 46 is low and no valve current is supplied. Because of the characteristics of the hydraulic system in an aircraft, it is desirable to have an initially large valve current in order to insure that the hydraulic system has been filled, then the further application of the valve pressure should be linear. This condition in the preferred embodiment is achieved by providing a current pulse by means of the combination of the resistor 101 and the capacitor 103, in the valve drive circuit 48.

At spin-up, the on-ramp voltage supplies voltage to the valve drive circuit 48 and the transistor 92 is in its ON condition. When the transistor 92 is turned on, the charging current through the capacitor 103 supplies a high voltage at the input of the valve driver circuit 48 and thereby a high valve current also. As the voltage on the capacitor 103 charges, this voltage will exponentially decay. Simultaneously, the potential at the collector of the transistor 92 is applied across resistors 105 and 107 thereby forcing the output of the amplifier 84 to go negative and the amplifier 72 of integrator 46 to charge linearly positive. After a few hundred milliseconds, the pulse voltage from capacitor 103 will have decreased to a point where the output voltage of the amplifier 72 is larger and therefore takes over the valve current through the valve drive circuit 48. The valve current (and the brake pressure) will therefore now increase linearly until a steady state condition is achieved.

When the off-ramp signal is applied through the off-ramp control circuit 52, the transistor 92 is turned off. The reference deceleration voltage (the voltage across the capacitor 94 in the deceleration reference circuit 31) will now decrease as the capacitor 94 discharges and the brake pressure will decrease in proportion to this voltage.

Lastly, the voltage regulator 53 is a conventional voltage regulator and takes the normal 28 D.C. voltage which is present in an aircraft and filters it through a plurality of resistors and then converts it into 15 volts and 4 volts at the points 96 and 98, respectively. These two voltages are used throughout the selective deceleration control circuit 10 which has just been described.

While the commonly employed term "rate of deceleration" has been used throughout the specification, it will be recognized that this term is used to represent the more technically accurate term "level of deceleration" and is not to be misconstrued as representing the third derivative of displacement.

It will be further recognized that the schematic diagram shown in FIG. 3 represents one illustrative embodiment of the invention. The various circuit elements are tabulated below as to value or type number. It will be recognized, however, that these values are exemplary and are merely illustrative of the invention, and various modifications may be made therein without departing from the spirit and scope of the invention. Unless otherwise noted, all capacitor values are in microfarads and all resistor values are in ohms or kiloohms.

| DECELERATION REFERENCE SIGNAL CIRCUIT - 31 | VALUE OR TYPE NUMBER |
|---|---|
| 33 | 1.5K |
| 34 | 665 |
| 94 | .47 mf |
| 70 | 100K |
| OFF RAMP CONTROL - 52 | VALUE OR TYPE NUMBER |
| 92 | 2N2907 |
| AVERAGING CIRCUIT - 38 | VALUE OR TYPE NUMBER |
| 54 through 54N | each 121K |
| 58 | 15K |
| 56 | ½ (747) |
| DIFFERENTIATOR CIRCUIT - 40 | VALUE OR TYPE NUMBER |
| 64 | ½ (747) |
| 66 | 49.9K |
| 62 | ½ (747) |
| COMPARATOR CIRCUIT - 42 | VALUE OR TYPE NUMBER |
| 68 | ½ (747) |
| LIMIT CIRCUIT - 44 | VALUE OR TYPE NUMBER |
| 78 | 1N914 |
| 80 | 1N914 |
| 74 | ½ (747) |
| 76 | ½ (747) |
| PBM INTEGRATOR CIRCUIT - 46 | VALUE OR TYPE NUMBER |
| 72 | ½ (747) |
| 75 | 100K |
| 73 | 4.7 mf |
| ON RAMP CONTROL CIRCUIT - 50 | VALUE OR TYPE NUMBER |
| 86 | 1N914 |
| 88 | 1N914 |
| 82 | ½ (747) |
| 84 | ½ (747) |
| 105 | 60.4K |
| 107 | 10K |
| 101 | 10K |
| 103 | 15 mf |
| VALVE - 48 | VALUE OR TYPE NUMBER |
| 90 | 37.4K |

What is claimed is:

1. A brake control system for applying and controlling the brake application means for a wheel of a vehicle independently of operator brake application comprising:
   signal generating means for producing a wheel speed signal that is a function of the rotational speed of said wheel;
   means compelled agreement differentiator for converting said signal into a deceleration signal which is a function of the rate of deceleration of said wheel;
   reference generating means for generating a preselected instant magnitude reference deceleration signal;
   rate selector means for manually selecting a preselected reference deceleration signal indicative of a desired rate of vehicle deceleration;
   comparison means for comparing said deceleration signal with said reference deceleration signal for generating a deceleration error signal indicative of the difference between said deceleration signal and said reference deceleration signal; and
   control means for providing a signal to said brake application means to apply brake pressure to said wheel independently of operator brake application and responsive to said deceleration error signal to provide brake control signal for controlling said brake pressure in order to maintain said desired rate of deceleration.

2. The invention defined in claim 1 further comprising an anti-skid control means to control said brake application means whereby said anti-skid control means controls said brake application means only when said deceleration brake control signal would cause said wheel to skid.

3. The invention defined in claim 1 further comprising a means for limiting the minimum and maximum magnitude of said deceleration error signal.

4. The invention defined in claim 1 wherein said brake control system further comprises a deceleration control turn-on means for energizing said control means and causing said control means to provide an initial deceleration control signal of maximum value commanding a full brake release followed by a gradual decrease from said maximum value to permit a corresponding gradual increase in brake pressure.

5. The invention defined in claim 1 wherein said brake control system further comprises means for deactuating said control means and for causing said control means to provide incident to said deactuation a deceleration control signal of gradually decreasing value to permit a gradual decrease in brake pressure.

6. The invention defined in claim 1 wherein said deceleration brake control signal comprises a time integral function of said deceleration error signal.

7. A brake control system for applying and controlling the brake application means associated with each wheel of a plurality of braked load bearing wheels of an aircraft independently of operator brake application comprising:
   signal generating means for each of said wheels for producing a wheel speed signal that is a function of the rotational speed of its associated wheel;
   averaging means responsive to the wheel speed signal associated with each of said wheels to form an average wheel speed signal therefrom;
   compelled agreement differentiator means for converting said average wheel speed signal into a deceleration signal which is the function of the average rate of deceleration of each of said wheels;
   reference generating means for generating a preselected constant magnitude reference deceleration signal;
   rate selector means for manually selecting a preselected reference deceleration signal indicative of a desired rate of vehicle deceleration;
   comparison means for comparing said deceleration signal with said reference deceleration signal for generating deceleration error signal indicative of the difference between said deceleration signal and said reference deceleration signal; and
   control means for providing a signal to said brake application means to apply brake pressure to said wheels independently of operator application and responsive to said deceleration error signal to provide a deceleration brake control signal for controlling said brake pressure in order to maintain said desired rate of deceleration.

8. The invention defined in claim 7 further comprising an anti-skid control means to control said brake application means whereby said anti-skid control means controls said brake application means only when said deceleration brake control signal would cause said wheel to skid.

9. The invention defined in claim 7 further comprising a means for limiting the minimum and maximum magnitude of said deceleration error signal.

10. The invention defined in claim 7 wherein said brake control system further comprises a deceleration control turn-on means for energizing said control means and causing said control means to provide an initial deceleration control signal of maximum value commanding a full brake release followed by a gradual decrease from said maximum value to permit a corresponding gradual increase in brake pressure.

11. The invention defined in claim 7 wherein said brake control system further comprises means for deactuating said control means and for causing said control means to provide incident to said deactuation a deceleration control signal of gradually decreasing value to permit a gradual decrease in brake pressure.

12. The invention defined in claim 7 wherein said deceleration brake control signal comprises a time integral function of said deceleration error signal.

* * * * *

UNITED STATES PATENT AND TRADEMARK OFFICE
CERTIFICATE OF CORRECTION

PATENT NO. : 3,920,278
DATED : November 18, 1975
INVENTOR(S) : Edgar A. Hirzel, Robert Dale Cook It is certified that error appears in the above-identified patent and that said Letters Patent are hereby corrected as shown below:

Col. 4, line 27, delete "palined" and substitute therefore --plained--.

Col. 9, line 8, delete the first occurrence of "means".

Col. 9, line 8, insert --means-- after differentiator and before for.

Signed and Sealed this

Fifth Day of July 1983

[SEAL]

Attest:

Attesting Officer

GERALD J. MOSSINGHOFF

Commissioner of Patents and Trademarks